United States Patent
Wu

(10) Patent No.: US 7,246,201 B2
(45) Date of Patent: Jul. 17, 2007

(54) SYSTEM AND METHOD FOR QUICKLY ACCESSING USER PERMISSIONS IN AN ACCESS CONTROL LIST

(75) Inventor: Cheng-Meng Wu, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 452 days.

(21) Appl. No.: 10/966,212

(22) Filed: Oct. 15, 2004

(65) Prior Publication Data
US 2005/0086536 A1    Apr. 21, 2005

(30) Foreign Application Priority Data
Oct. 15, 2003    (TW) .............................. 92128504 A

(51) Int. Cl.
*G06F 12/00* (2006.01)
(52) U.S. Cl. .................. 711/119; 711/163; 709/225; 713/182; 726/26; 726/28
(58) Field of Classification Search .................. 726/26
See application file for complete search history.

(56) References Cited

U.S. PATENT DOCUMENTS 5,469,556 A *  11/1995  Clifton ..................... 711/163
5,956,715 A *   9/1999  Glasser et al. ................. 707/9
6,321,334 B1*  11/2001  Jerger et al. .................... 726/1
6,981,281 B1*  12/2005  LaMacchia et al. .......... 726/27
2003/0041267 A1*  2/2003  Fee et al. .................... 713/201
2003/0120949 A1*  6/2003  Redlich et al. ............. 713/200
2007/0039045 A1*  2/2007  McKee et al. ................ 726/21

* cited by examiner

*Primary Examiner*—Donald Sparks
*Assistant Examiner*—Jesse Diller
(74) *Attorney, Agent, or Firm*—Wei Te Chung

(57) ABSTRACT

A system for quickly accessing user permissions in an access control list includes a first cache memory (2), a second cache memory (3), a permission querying module (12), a permission merging module (13), and an information unit generating module (14). The first cache memory is for storing a plurality of first information units (20). The second cache memory is for storing a plurality of second information units (30). The permission querying module is for querying the user permissions stored in the first cache memory and the second cache memory, and respectively storing first information units and second information units in the first cache memory and the second cache memory. The permission merging module is for merging different user permissions. The information unit generating module is for generating the first information units and the second information units. A related method is also disclosed.

13 Claims, 4 Drawing Sheets

| | CURRENT COMPUTED PERMISSION | INHERITED PERMISSION | MERGED RESULT |
|---|---|---|---|
| 1 | NA | NA/RO/WO/RW/FC | NA |
| 2 | RO | NA/RO | RO |
| 3 | RO | WO/RW | RW |
| 4 | RO | FC | FC |
| 5 | WO | NA/WO | WO |
| 6 | WO | RO/RW | RW |
| 7 | WO | FC | FC |
| 8 | RW | NA/RO/WO/RW | RW |
| 9 | RW | FC | FC |
| 10 | FC | NA/RO/WO/RW/FC | FC |

SYSTEM AND METHOD FOR QUICKLY ACCESSING USER PERMISSIONS IN AN ACCESS CONTROL LIST

FIELD OF THE INVENTION

The present invention relates to a computer data processing system in an NAS (network attached storage) system, and especially to a system and method for accessing user permissions in an access control list.

BACKGROUND OF THE INVENTION

In an NAS (network attached storage) system, it is an especially important function to set user permissions relating to documents stored in the system. There are a number of software tools available for setting user permissions. For example, P.R. China patent application No. 01122441.x entitled "System and Method for Setting User Permissions in a File System" discloses a system and method for setting user permissions. The system uses a permission verifying module and a permission setting module to set the user permissions of a document or part of the document in accordance with data on user IDs (identification codes) and user permission grades. The system can enhance efficiency in managing files, and improve security in a file system. However, the system can not quickly access the user permissions of documents in an access control list.

For example, the procedure of accessing a document comprises the following steps: verifying whether a user has a request process permission in relation to the document; and permitting the user to process the document if the user has the request permission. The procedure of verifying comprises the steps of: querying a user permission of a root directory in which the document is stored; querying the user permissions of lower directories one by one; and querying the user permission of the document. In this procedure, a cache memory can only store the latest semi-result of querying, and can not use other semi-results of querying. One user permission may be repeatedly queried. In addition, the procedure of querying takes too much time.

SUMMARY OF THE INVENTION

Accordingly, an objective of the present invention is to provide a system and method for quickly accessing user permissions in an access control list.

Another objective of the present invention is to provide a system and method for access user permissions by using data stored in a first cache memory and a second cache memory.

In order to achieve the above-mentioned objectives, a system for quickly accessing user permissions in an access control list in accordance with the present invention comprises a first cache memory, a second cache memory, a permission querying module, a permission merging module, and an information unit generating module. The first cache memory is for storing a plurality of first information units, the first information units stored data on a user permission of a latest accessed user. The second cache memory is for storing a plurality of second information units, the second information units stored semi-results of computing different user permissions and directory relations. The permission querying module is for querying the user permissions stored in the first cache memory and the second cache memory, and respectively storing the first information units and the second information units in the first cache memory and the second cache memory. The permission merging module is for merging different user permissions. The information unit generating module is for generating the first information units and the second information units.

Further, in order to achieve the above-mentioned objectives, a method for quickly accessing user permissions in an access control list in accordance with the present invention comprises the steps of: (a) generating a dummy node in a root directory of a network attached storage server, the dummy node being a dummy user Permission ID; (b) adding a first information unit to the first cache memory, the first information units stored data on a user permission of a latest accessed user; (c) querying a latest Permission ID $I_L$ and a currently requested Permission ID $I_C$ in a second cache memory in accordance with a unique user ID U and a current computed Permission ID $P_C$; (d) determining whether the latest Permission ID $I_L$ and the currently requested Permission ID $I_C$ are found; (e) generating a first information unit if the required Permission ID is found; and (f) if no required Permission ID is found: (f1) assigning an inherited Permission ID $P_I$ as being the result of merging the current computed Permission ID $P_C$ and the inherited Permission ID, and assigning a last current computed Permission ID $P_C'$ as being the current computed Permission ID $P_C$; and (f2) determining whether a user process request is permitted.

Other objects, advantages and novel features of the present invention will be drawn from the following detailed description of preferred embodiments of the present invention with the attached drawings, in which:

DETAILED DESCRIPTION OF PREFERRED EMBODIMENTS OF THE INVENTION

Reference will now be made to the drawings to describe the present invention in detail.

Figure 1:
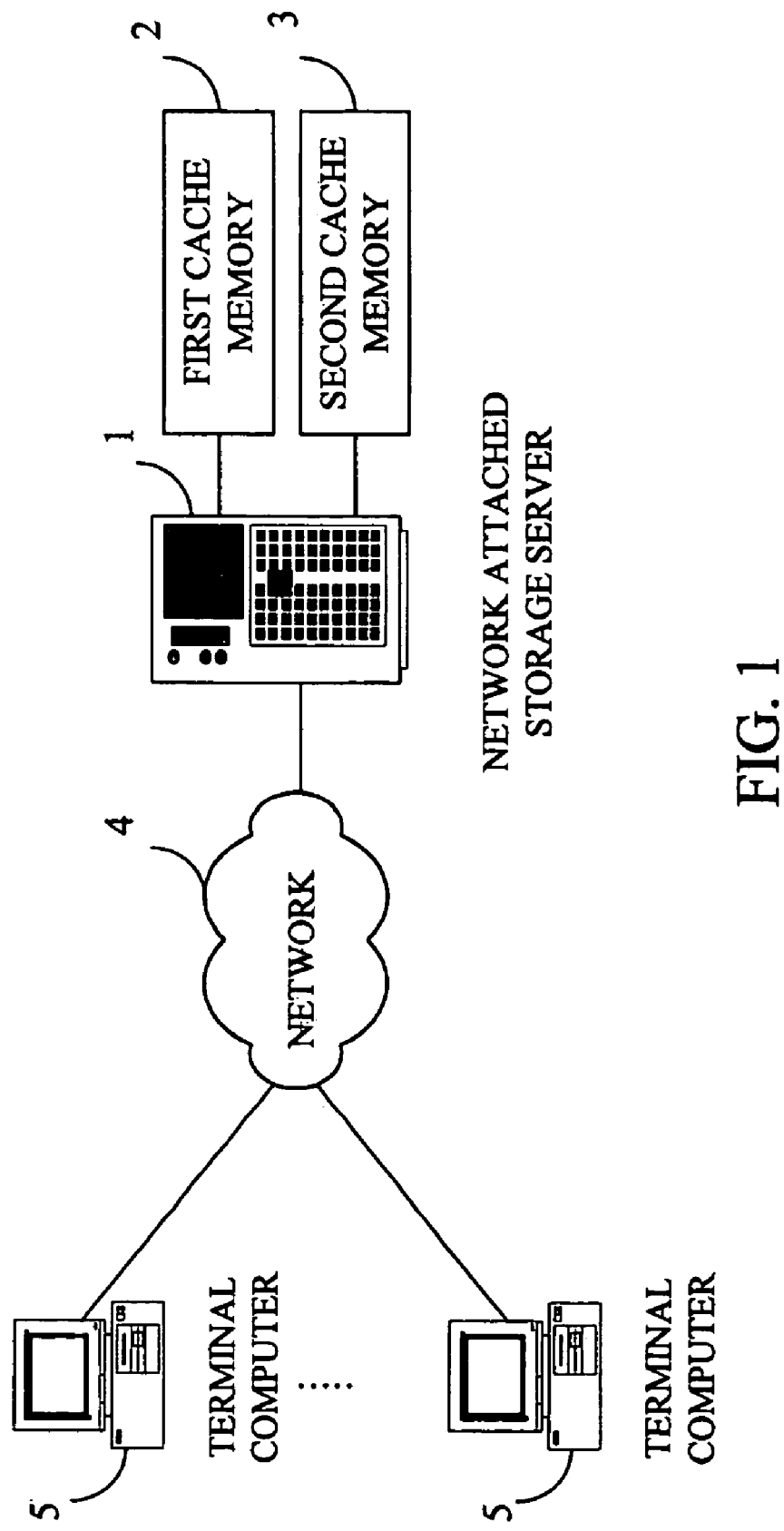
FIG. 1 is a schematic diagram of hardware configuration of a system for quickly accessing user permission in an access control list in accordance with a preferred embodiment of the present invention.

FIG. 1 is a schematic diagram of hardware configuration of a system for quickly accessing user permission in an access control list in accordance with the preferred embodiment of the present invention. The system for quickly accessing user permission in an access control list comprises a network attached storage server 1, a first cache memory 2, a second cache memory 3, a network 4, and a plurality terminal computers 5. The network 4 connects the terminal computers 5 with the network attached storage server 1. The network 4 can be the Internet, an intranet, or another suitable kind of electronic communications network. The network attached storage server 1 is interconnected with the first cache memory 2 and the second cache memory 3 via a system bus. The network attached storage server 1 stores a plurality of documents. Each of the terminal computers 5 provides an interface for users to process the documents stored in the network attached storage server 1. Such processing comprises reading, writing, deleting, and modifying data stored in the documents. The first cache memory 2 and the second cache memory 3 are used to store permissions. The permissions are data on restrictions on processing of the documents stored in the network attached storage server 1.

Figures 2, 3:
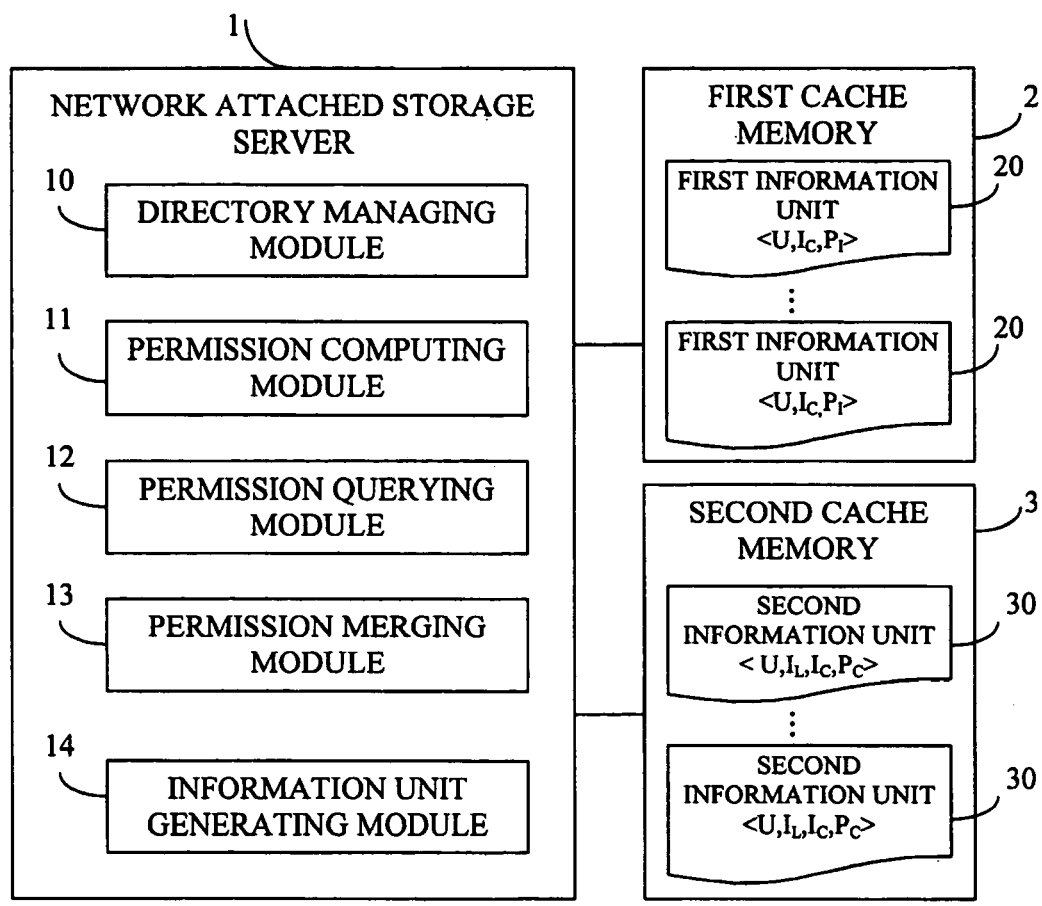
FIG. 2 is a block diagram of function modules of the network attached storage server, the first cache memory, and the second cache memory of the system of FIG. 1.
FIG. 3 is a list of rules for merging permissions, in accordance with the present invention.

FIG. 2 is a block diagram of function modules of the network attached storage server 1, the first cache memory 2, and the second cache memory 3. The network attached storage server 1 comprises a directory managing module 10, a permission computing module 11, a permission querying module 12, a permission merging module 13, and an information unit generating module 14. The first cache memory 2 comprises a plurality of first information units 20. The second cache memory 3 comprises a plurality of second information units 30.

The directory managing module 10 is programmed to manage a directory of the documents stored in the network attached storage server 1, such management comprising reading, writing, deleting, and modifying the documents. The permission computing module 11 computes a value of a Permission $P_C$ of a current accessing target, the target comprising a document or a directory. The permission querying module 12 is for querying the Permission $P_C$ in the first cache memory 2 and the second cache memory 3. The permission merging module 13 is used to generate an inherited Permission $P_I$ of a current accessing target in accordance with the first information units 20 and the second information units 30. The information unit generating module 14 is used for generating the information units 20, 30, and stores the information units 20, 30 in the first and second cache memories 2, 3 respectively.

The first cache memory 2 stores semi-results of querying, and each semi-result is stored in a first information unit 20. The first cache memory 2 can store only one semi-result for each query at a time, and the semi-result stored therein is a target process permission most recently queried. The first information unit 20 comprises data on a unique user ID (identification code) U, a currently requested Permission ID $I_C$, and an inherited Permission ID $P_I$. The first information unit 20 is expressed in the form of <$I_C$, U, $P_I$>. The unique user ID U is used to identify a current user. The currently requested Permission ID $I_C$ is a permission code stored in an ACL (access control list), and the permission code denotes different process permissions of different users to a current target. The ACL stores 1024 permission codes. For example, a company's document process permission for a manager is FC (full control), and the company document process permission of a general user is RO (read only). The currently requested permission identification code $I_C$ is generated by an operating system or set by an owner of the current target. The inherited permission identification code $P_I$ is a permission code inherited from a priority directory of the current target.

The second cache memory 3 stores other semi-results of querying, and each of the semi-results is stored in a second information unit 30. A capacity of the second cache memory 3 is 64 KB (kilobytes), and the second cache memory 3 can store 16 semi-results at one time. The second information unit 30 comprises data on a unique user ID U, a latest Permission ID $I_L$, a currently requested Permission ID $I_C$, and a current computed Permission ID $P_C$. The second information unit 30 is expressed in the form of <U, $I_L$, $I_C$, $P_C$>. The latest Permission ID $I_L$ is a latest accessed permission code of a target. The current computed Permission ID $P_C$ is a computed permission for a current target in accordance with $I_C$ (this is described in more detail below in relation to FIG. 4).

FIG. 3 is a list of rules for merging the permissions. The list comprises a current computed permission column, an inherited permission column, and a merged result column. The list shows the merging rules of the current computed Permissions $P_C$ and the inherited Permissions $P_I$. As shown in the first line, a current Permission NA (no access) takes priority over inherited Permissions RO (read only), WO (write only), RW (read and write) and FC (full control). That is, if a current Permission NA merges with an inherited Permission RO, WO, RW, or FC, the merged result is Permission NA. As shown in the second line, the merged result of current Permission RO and inherited Permission NA or RO is Permission RO. The third line through to the tenth line show other merging rules.

In addition, the directory managing module 10 sets a priority of an upper layer directory as taking priority over a priority of a lower layer directory. That is, the current computed Permission $P_C$ takes priority over the inherited Permission $P_I$. As the permission merging module 13 merges $P_C$ with $P_I$, the permission querying module 12 stops querying $P_I$ if the merged result is Permission NA or Permission FC. However, a current processing request of the user is permitted.

Figure 4:
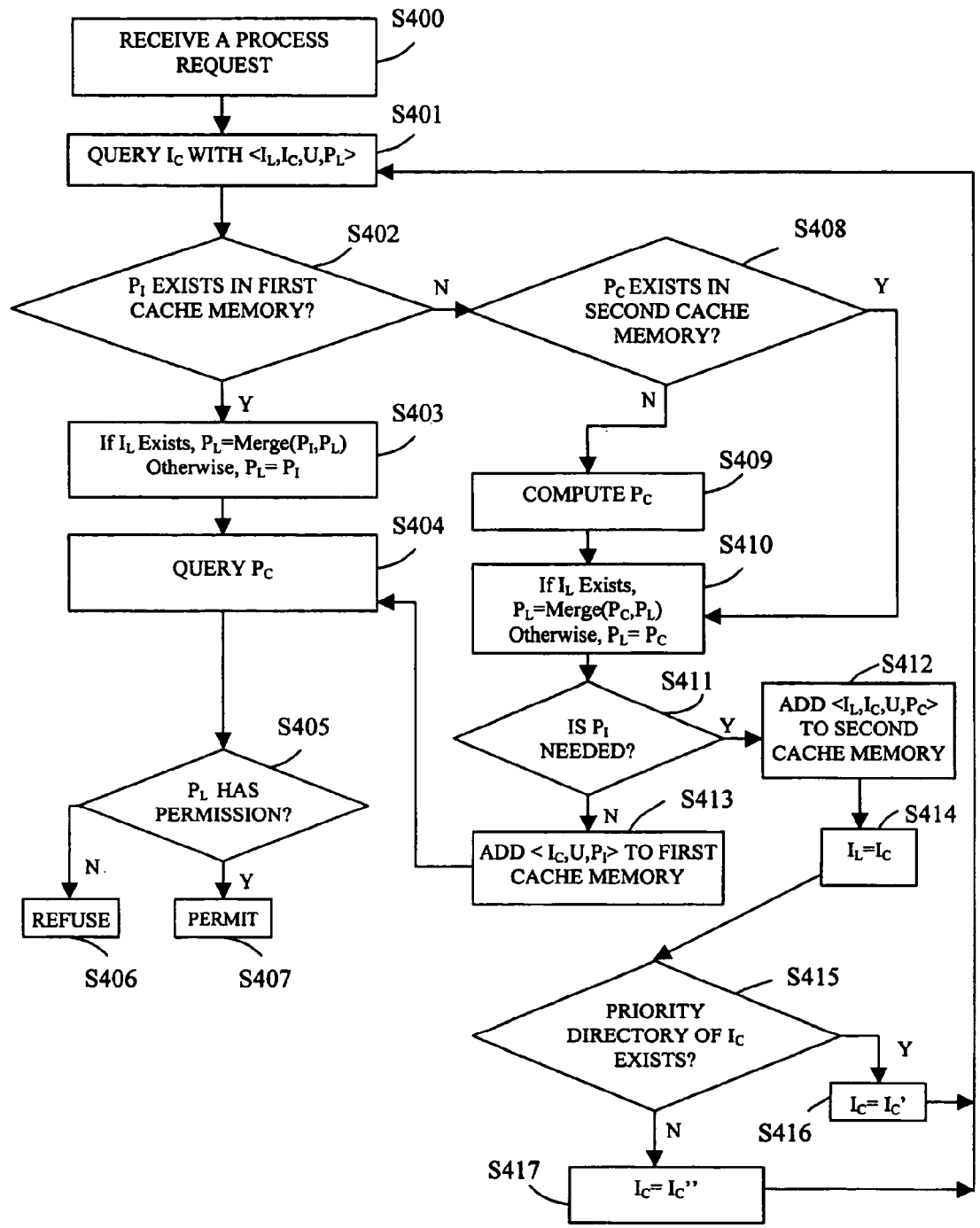
FIG. 4 is a flow chart of a preferred method for quickly accessing user permissions in an access control list, in accordance with the present invention.

FIG. 4 is a flow chart of a preferred method of the present invention for quickly accessing user permissions in an access control list. In step S400, the system receives a process request to a target input by a current user via one of the terminal computers 5. In step S401, the permission querying module 12 queries a currently requested Permission ID $I_C$ of a current target in the first cache memory 2 in accordance with an information unit <$I_L$, $I_C$, U, $P_L$>. A last merged Permission ID $P_L$ is a permission code of a merged result of a current target. In step S402, the permission querying module 12 queries an inherited Permission ID $P_I$ of the current user in the first cache memory 2, and determines whether the inherited Permission ID $P_I$ exists in the first cache memory 2.

If the inherited Permission ID $P_I$ exists, the procedure goes to step S403. In step S403, if a latest Permission ID $I_L$ of the current user exists in the first cache memory 2, the permission merging module 13 merges the inherited Permission ID $P_I$ and last merged Permission ID $P_L$ in accordance with the merging rules shown in FIG. 3. If a latest Permission ID $I_L$ does not exist in the first cache memory 2, the permission merging module 13 directly assigns the last merged Permission ID $P_L$ as being the inherited Permission ID $P_I$. If the inherited Permission ID $P_I$ does not exist, the procedure goes to step S408 described below.

In step S404, the permission querying module 12 queries a current computed Permission ID $P_C$ corresponding to the currently requested Permission ID $I_C$ in the second cache memory 3. In step S405, the permission querying module 12 compares the last merged Permission ID $P_L$ with the current computed Permission ID $P_C$, and determines whether the current user has a process permission. If the current user has the process permission, in step S407, the system permits the process request. If the current user does not has the process permission, in step S406, the system refuses the process request.

In step S408, the permission querying module 12 queries the current computed Permission ID $P_C$ in the second cache memory 3 in accordance with the second information unit <U, $I_L$, $I_C$, $P_C$>, and determines whether the current computed Permission ID $P_C$ exists. If the current computed Permission ID $P_C$ exists, the procedure goes to step S410 described below. If the current computed Permission ID $P_C$ does not exist, in step S409, the permission computing module 11 computes a value of the current computed Permission ID $P_C$. In step S410, if the latest Permission ID $I_L$ exists in the second cache memory 3, the permission merging module 13 merges the current computed Permission ID $P_C$ and last merged Permission ID $P_L$ in accordance with the merging rules shown in FIG. 3. If the latest Permission ID $I_L$ does not exist, the permission merging module 13 directly assigns the last merged Permission ID $P_L$ as being the current computed Permission ID $P_C$.

In step S411, the permission computing module 13 determines whether to inherit the inherited Permission ID $P_I$. If the inherited Permission ID $P_I$ does not need to be inherited, in step S413, the information unit generating module 14 generates a first information unit <$I_C$, U, $P_I$>, and stores the first information unit in the first cache memory 2, whereupon the procedure goes to step S404. If the inherited Permission ID $P_I$ needs to be inherited, in step S412, the information unit generating module 14 generates a second information unit <U, $I_L$, $I_C$, $P_C$>, and stores the second information unit in the second cache memory 3. In step S414, the permission merging module 11 directly assigns the latest Permission ID $I_L$ as being the currently requested Permission ID $I_C$. In step S415, the permission querying module 12 determines whether the current target has a priority directory. If a priority directory exists, in step S416, the permission merging module 13 directly assigns the currently requested Permission ID $I_C$ as being a currently requested Permission ID $I_C'$ of the priority directory, whereupon the procedure returns to step S401. If a priority directory does not exist, in step S417, the permission merging module 13 directly assigns the currently requested Permission ID $I_C$ as being a currently requested Permission ID $I_C''$ of a dummy node, whereupon the procedure returns to step S401. The currently requested Permission ID $I_C''$ of a dummy node is pre-set by the operating system, and comprises Permission FC for managers and Permission RW for general users.

Figure 5:
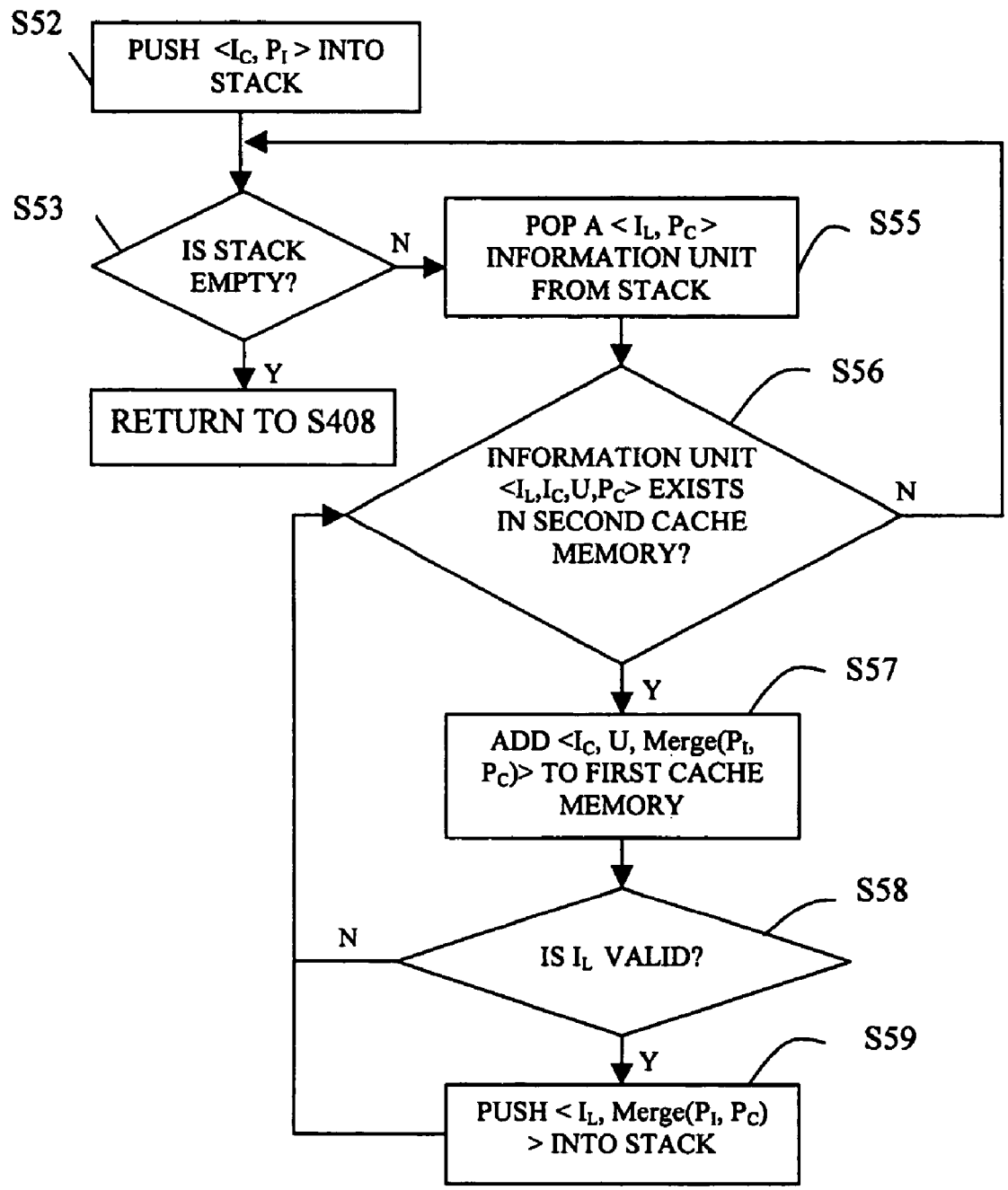
FIG. 5 is a flow chart of a preferred method for querying data stored in the second cache memory in accordance with the present invention.

FIG. 5 is a flow chart of a preferred method for querying data stored in the second cache memory 3, in accordance with the present invention. In step S52, the system pushes an information unit <$I_C$, $P_I$> in-to a stack S. In step S53, the system decides whether the stack S is empty. If the stack S is empty, the procedure goes to step S408 of FIG. 4. If the stack S is not empty, in step S55, the system pops an information unit <$I_L$, $P_C$> from the stack S. In step S56, the permission querying module 12 queries the second cache memory 3 to find second information unit <U, $I_L$, $I_C$, $P_C$> which comprises the information unit <$I_L$, $P_C$>, and deletes the second information unit <U, $I_L$, $I_C$, $P_C$> from the second cache memory 3. If no second information unit <U, $I_L$, $I_C$, $P_C$> is found, the procedure returns to step S53. If the second information unit <U, $I_L$, $I_C$, $P_C$> is found, in step S57, the permission querying module 12 adds the second information unit <$I_C$, U, Merge($P_I$, $P_C$)> to the first cache memory 2. The value of Merge($P_I$, $P_C$) is the result of merging the inherited Permission ID $P_I$ with the current computed Permission ID $P_C$ in accordance with the merging rules shown in FIG. 3. In the merging procedure, the permission merging module 14 replaces the current computed Permission ID $P_C$ with the latest Permission ID $I_L$. In step S58, the system determines whether the latest Permission ID $I_L$ is valid. If the latest Permission ID $I_L$ is not valid, the procedure returns to step S56. If the latest Permission ID $I_L$ is valid, in step S59, the permission querying module 12 pushes the information unit <$I_L$, Merge($P_I$, $P_C$)> into the stack S, whereupon the procedure returns to step S56.

Although only a preferred embodiment and preferred methods of the present invention have been described in detail above, those skilled in the art will readily appreciate that many modifications to the preferred embodiment and methods are possible without materially departing from the novel teachings and advantages of the present invention. Accordingly, all such modifications are deemed to be covered by the following claims and allowable equivalents of the claims.

What is claimed is:

1. A system for quickly accessing user permissions in an access control list of a network attached storage server, comprising:
   a first cache memory for storing a plurality of first information units, the first information units each storing data on a user permission of a latest accessed user;
   a second cache memory for storing a plurality of second information units, the second information units storing semi-results of computing different user permissions and directory relations;
   a permission querying module for querying the user permissions stored in the first cache memory and the second cache memory, and for respectively storing the first information units and the second information units in the first cache memory and the second cache memory;
   a permission merging module for merging different user permissions; and
   an information unit generating module for generating the first information units and the second information units.

2. The system as claimed in claim 1, wherein each of the first information units comprises data on a unique user ID (identification code) U, a currently requested Permission ID $I_C$, and an inherited Permission ID $P_I$.

3. The system as claimed in claim 1, wherein each of the second information units comprises data on a unique user ID U, a latest Permission ID $I_L$, a currently requested Permission ID $I_C$, and a current computed Permission ID $P_C$.

4. The system as claimed in claim 1, wherein a capacity of the second cache memory is 64 KB (kilobytes).

5. The system as claimed in claim 1, wherein the second cache memory can store 16 semi-results at one time.

6. The system as claimed in claim 1, further comprising a directory managing module for managing a directory of the documents stored in the network attached storage server, such management comprising reading, writing, deleting, and modifying the documents.

7. The system as claimed in claim 1, further comprising a permission computing module for computing a value of a Permission $P_C$ of a current accessing target, the target comprising a document or a directory.

8. The system as claimed in claim 2, wherein the permission merging module merges the inherited Permission ID $P_I$ with the current computed Permission ID $P_C$.

9. The system as claimed in claim 3, wherein the permission merging module merges the inherited Permission ID $P_I$ with the current computed Permission ID $P_C$.

10. A method for quickly accessing user permissions in an access control list of a network attached storage server, the method comprising the steps of:
    generating a dummy node in a root directory of the network attached storage server, the dummy node being a dummy user Permission ID;

adding a first information unit to a first cache memory, the first information unit storing data on a user permission of a latest accessed user;

querying a latest Permission ID $I_L$ and a currently requested Permission ID $I_C$ in a second cache memory, in accordance with a unique user ID U and a current computed Permission ID $P_C$;

determining whether the latest Permission ID $I_L$ and the currently requested Permission ID $I_C$ are found;

generating a first information unit if the required Permission ID is found; and if no required Permission ID is found, assigning an inherited Permission ID $P_I$ as being the result of merging the current computed Permission ID $P_C$ and the inherited Permission ID $P_I$, and assigning a last current computed Permission ID $P_C'$ as being the current computed Permission ID $P_C$; and determining whether a user process request is permitted.

11. The method as claimed in claim 10, further comprising the step of:

adding a plurality of second information units to the second cache memory.

12. The method as claimed in claim 10, wherein said merging is performed according to a list of rules on merging of permissions.

13. The method as claimed in claim 10, wherein the dummy node is pre-set by an operating system, and comprises Permission FC(full control) for managers Permission RW(read write) for general users.

* * * * *